United States Patent
Shi et al.

(10) Patent No.: US 11,102,695 B2
(45) Date of Patent: Aug. 24, 2021

(54) BEAM AVOIDANCE METHOD AND BASE STATION

(71) Applicant: HUAWEI TECHNOLOGIES CO., LTD., Guangdong (CN)

(72) Inventors: Xianwen Shi, Shenzhen (CN); Shuqi Sun, Shanghai (CN); Feng Qian, Shanghai (CN); Qunfang Lou, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 33 days.

(21) Appl. No.: 16/574,566

(22) Filed: Sep. 18, 2019

(65) Prior Publication Data
US 2020/0015141 A1 Jan. 9, 2020

Related U.S. Application Data

(63) Continuation of application No. PCT/CN2017/077948, filed on Mar. 23, 2017.

(51) Int. Cl.
*H04W 72/08* (2009.01)
*H04W 36/30* (2009.01)
*H04B 17/327* (2015.01)
*H04W 36/00* (2009.01)
*H04W 36/36* (2009.01)
*H04W 72/04* (2009.01)

(52) U.S. Cl.
CPC .......... *H04W 36/30* (2013.01); *H04B 17/327* (2015.01); *H04W 36/0058* (2018.08);
(Continued)

(58) Field of Classification Search
CPC .... H04B 17/327; H04B 7/024; H04B 7/0617; H04B 24/10; H04W 36/0058;
(Continued)

(56) References Cited

U.S. PATENT DOCUMENTS

2012/0122507 A1* 5/2012 Gao ................. H04B 7/024
455/509
2013/0310058 A1* 11/2013 Ibrahim ............ H04W 52/241
455/452.1
(Continued)

FOREIGN PATENT DOCUMENTS

CN 103199973 A 7/2013
CN 103973354 A 8/2014
(Continued)

*Primary Examiner* — Mewale A Ambaye
(74) *Attorney, Agent, or Firm* — Womble Bond Dickinson (US) LLP

(57) ABSTRACT

A beam avoidance method comprises: determining, by a first base station, that first UE transmitting a service on a currently scheduled RB is benefited UE, where a cell in which the first UE is located is a first cell; determining, by the first base station, whether a user is satisfied with a service that is of second UE and that is transmitted on the currently scheduled RB, where a cell in which the second UE is located is a second cell, and the second cell is a cell adjacent to the first cell; and adjusting, by the first base station, a transmit weight of the second UE if the user is satisfied with the service that is of the second UE and that is transmitted on the currently scheduled RB.

18 Claims, 6 Drawing Sheets

(52) U.S. Cl.
CPC ....... *H04W 36/0085* (2018.08); *H04W 36/36* (2013.01); *H04W 72/046* (2013.01); *H04W 72/085* (2013.01)

(58) Field of Classification Search
CPC . H04W 36/0085; H04W 36/30; H04W 36/36; H04W 72/046; H04W 72/085; H04W 16/28; H04M 17/10
See application file for complete search history.

(56) References Cited

U.S. PATENT DOCUMENTS

| | | | |
|---|---|---|---|
| 2014/0334320 A1* | 11/2014 | Liu | H04L 5/0098 370/252 |
| 2015/0063222 A1* | 3/2015 | Wang | H04W 72/1226 370/329 |
| 2015/0094114 A1* | 4/2015 | Rao | H04W 52/245 455/522 |
| 2015/0296490 A1 | 10/2015 | Yi et al. | |
| 2017/0026984 A1 | 1/2017 | Shi et al. | |
| 2018/0262237 A1* | 9/2018 | Chen | H04B 7/024 |
| 2019/0238282 A1* | 8/2019 | Cao | H04W 88/085 |
| 2019/0394783 A1* | 12/2019 | Byun | H04W 72/0446 |

FOREIGN PATENT DOCUMENTS

| | | |
|---|---|---|
| CN | 105307210 A | 2/2016 |
| CN | 106160822 A | 11/2016 |
| EP | 3337211 A1 | 6/2018 |
| WO | 2015154295 A1 | 10/2015 |

\* cited by examiner

BEAM AVOIDANCE METHOD AND BASE STATION

CROSS-REFERENCE TO RELATED APPLICATIONS

This application is a continuation of International Application No. PCT/CN2017/077948, filed on Mar. 23, 2017, the disclosure of which is hereby incorporated by reference in its entirety.

TECHNICAL FIELD

Embodiments of the present invention relate to the communications field, and in particular, to a beam avoidance method and a base station.

BACKGROUND

It is common knowledge that, in a long term evolution (LTE) system, interference exists between cells because a spectrum reuse technology is applied. As shown in FIG. 1, user equipment (UE) 2 in a cell 2 managed by a base station 2 interferes with UE 1 located at an edge of a cell 1 managed by a base station 1. In the prior art, interference between cells can be suppressed as much as possible by using a coordinated beamforming (CBF) technology.

A basic idea of the CBF technology is as follows: For edge UE that is severely interfered with, a transmit weight of UE in a neighboring cell of a cell in which the edge UE is located may be adjusted to implement beam avoidance, thereby suppressing interference on the edge UE, and improving a signal to interference plus noise ratio (SINR) of the edge UE. In the CBF technology, the neighboring cell in which the transmit weight of the UE is adjusted to implement the beam avoidance is referred to as a coordinated cell.

At least the following problem exists in the prior art: Although the CBF technology can be used to suppress the interference and improve the SINR of the edge UE, a probability of deterioration in performance of the UE on which the beam avoidance is performed in the coordinated cell is increased.

SUMMARY

Embodiments of the present invention provide a beam avoidance method and a base station, to resolve a problem of an increase in a probability of deterioration in performance of UE on which beam avoidance is performed in a coordinated cell.

To achieve the foregoing objective, the following technical solutions are used in the embodiments of the present invention.

A first aspect of the embodiments of the present invention provides a beam avoidance method, including:

determining, by a first base station, that first UE transmitting a service on a currently scheduled resource block (RB) is benefited UE, where a cell in which the first UE is located is a first cell; determining whether a user is satisfied with a service that is of second UE and that is transmitted on the currently scheduled RB, where a cell in which the second UE is located is a second cell, and the second cell is a cell adjacent to the first cell; and adjusting, by the first base station, a transmit weight of the second UE if the user is satisfied with the service that is of the second UE and that is transmitted on the currently scheduled RB.

According to the beam avoidance method provided in this embodiment of the present invention, when determining that the first UE transmitting the service on the currently scheduled RB is the benefited UE, the first base station determines whether the user is satisfied with the service that is of the second UE and that is transmitted on the currently scheduled RB, and adjusts the transmit weight of the second UE if the user is satisfied with the service that is of the second UE and that is transmitted on the currently scheduled RB. If the first base station managing a coordinated cell determines that UE in a neighboring cell that transmits a service on the currently scheduled RB is benefited UE, when the first base station determines that a user is satisfied with a service of UE in the coordinated cell that is transmitted on the currently scheduled RB, the first base station adjusts a transmit weight of the UE, to implement beam avoidance for the benefited UE, namely, the UE in the neighboring cell. Beam avoidance is performed on the UE in the coordinated cell that serves as impacted UE only when it is determined that the user is satisfied with the service of the UE. Therefore, a probability of deterioration in performance of the UE on which the beam avoidance is performed in the coordinated cell is reduced.

With reference to the first aspect, in one embodiment, to ensure that a stable positive gain can be obtained by using a CBF technology, before the determining, by the first base station, whether a user is satisfied with a service that is of second UE and that is transmitted on the currently scheduled RB, the beam avoidance method may further include: determining, by the first base station, whether the service that is of the second UE and that is transmitted on the currently scheduled RB is a video service; and in this case, the determining, by the first base station, whether a user is satisfied with a service that is of second UE and that is transmitted on the currently scheduled RB may specifically include: if the service that is of the second UE and that is transmitted on the currently scheduled RB is the video service, determining, by the first base station, whether the user is satisfied with the service that is of the second UE and that is transmitted on the currently scheduled RB.

With reference to the first aspect, in one embodiment, the beam avoidance method may further include: adjusting, by the first base station, the transmit weight of the second UE if the service that is of the second UE and that is transmitted on the currently scheduled RB is not the video service.

With reference to the first aspect, in one embodiment, the determining, by the first base station, whether a user is satisfied with a service that is of second UE and that is transmitted on the currently scheduled RB may specifically include: determining, by the first base station, whether a scheduling rate of the service of the second UE is greater than or equal to a target rate; and/or determining, by the first base station, whether video buffer duration of the service of the second UE is greater than or equal to a preset duration threshold; and/or determining, by the first base station, whether video playback status information of the service of the second UE is normal playback.

With reference to the first aspect, in one embodiment, before the determining, by the first base station, whether a user is satisfied with a service that is of second UE and that is transmitted on the currently scheduled RB, the beam avoidance method may further include: receiving, by the first base station, video feature parameter information sent by the second UE, where the video feature parameter information includes a video bitrate, the video buffer duration of the service of the second UE, and the video playback status information of the service of the second UE, where the video bitrate is used to determine the target rate, and the video playback status information of the service of the second UE is the normal playback or frame freezing.

With reference to the first aspect, in one embodiment, before the determining, by the first base station, whether the service that is of the second UE and that is transmitted on the currently scheduled RB is a video service, the beam avoidance method may further include: receiving, by the first base station, video service identification information sent by the second UE, where the video service identification information is used to identify whether the service that is of the second UE and that is transmitted on the currently scheduled RB is the video service; and in this case, the determining, by the first base station, whether the service that is of the second UE and that is transmitted on the currently scheduled RB is a video service may specifically include: determining, by the first base station based on the video service identification information, whether the service that is of the second UE and that is transmitted on the currently scheduled RB is the video service.

With reference to the first aspect, in one embodiment, the determining, by the first base station, whether the service that is of the second UE and that is transmitted on the currently scheduled RB is a video service may specifically include: obtaining, by the first base station, identification information of the service of the second UE, where the identification information includes at least one of the following: a domain name or an Internet protocol (IP) address; and determining, by the first base station based on the identification information of the service of the second UE, whether the service that is of the second UE and that is transmitted on the currently scheduled RB is the video service.

With reference to the first aspect, in one embodiment, the determining, by a first base station, that first UE transmitting a service on a currently scheduled RB is benefited UE may specifically include: determining, by the first base station, that the first UE is the benefited UE, when determining that the service that is of the first UE and that is transmitted on the currently scheduled RB is a video service, and determining that a difference between reference signal received power (RSRP) of the first cell and RSRP of a neighboring cell that are in a measurement report reported by the first UE is less than a preset interference threshold, where the neighboring cell includes the second cell.

With reference to the first aspect, in one embodiment, the determining, by the first base station, that the first UE is the benefited UE, when determining that the service that is of the first UE and that is transmitted on the currently scheduled RB is a video service, and determining that a difference between RSRP of the first cell and RSRP of a neighboring cell that are in a measurement report reported by the first UE is less than a preset interference threshold may specifically include: determining, by the first base station, that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

With reference to the first aspect, in one embodiment, the determining, by a first base station, that first UE transmitting a service on a currently scheduled RB is benefited UE may specifically include: receiving, by the first base station, indication information sent by a second base station, where the indication information is used to indicate that the first UE is the benefited UE; and determining, by the first base station according to the indication information, that the first UE transmitting the service on the currently scheduled RB is the benefited UE.

A second aspect of the embodiments of the present invention provides a beam avoidance method, including: determining, by a second base station, that first UE is benefited UE, when determining that a service that is of the first UE and that is transmitted on a currently scheduled RB is a video service, and determining that a difference between RSRP of a first cell and RSRP of a neighboring cell that are in a measurement report reported by the first UE is less than a preset interference threshold, where a cell in which the first UE is located is the first cell, the neighboring cell includes a second cell, and the second cell is a cell managed by a first base station; and sending, by the second base station, indication information to the first base station, where the indication information is used to indicate that the first UE is the benefited UE.

According to the beam avoidance method provided in this embodiment of the present invention, the second base station determines that the first UE is the benefited UE, when determining that the service that is of the first UE and that is transmitted on the currently scheduled RB is the video service, and determining that the difference between the RSRP of the first cell and the RSRP of the neighboring cell that are in the measurement report reported by the first UE is less than the preset interference threshold, and sends the indication information to the first base station, where the indication information is used to indicate that the first UE is the benefited UE. UE is determined as benefited UE only when it is determined that a service that is of the UE and that is transmitted on the currently scheduled RB is a video service, and it is determined that a difference between the RSRP of the first cell and the RSRP of the neighboring cell that are in a measurement report reported by the UE is less than the preset interference threshold. In this way, a quantity of benefited UEs is reduced, thereby reducing impact on performance of UE in a coordinated cell.

With reference to the second aspect, in one embodiment, the determining, by a second base station, that first UE is benefited UE, when determining that a service that is of the first UE and that is transmitted on a currently scheduled RB is a video service, and determining that a difference between RSRP of a first cell and RSRP of a neighboring cell that are in a measurement report reported by the first UE is less than a preset interference threshold may specifically include: determining, by the second base station, that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

With reference to the second aspect, in one embodiment, the second base station may determine, in the following manner, whether the user is satisfied with the service that is of the first UE and that is transmitted on the currently scheduled RB: determining, by the second base station, whether a scheduling rate of the service of the first UE is greater than or equal to a target rate; and/or determining, by the second base station, whether video buffer duration of the service of the first UE is greater than or equal to a preset duration threshold; and/or determining, by the second base station, whether video playback status information of the service of the first UE is normal playback.

With reference to the second aspect, in one embodiment, before the second base station determines whether the user is satisfied with the service that is of the first UE and that is transmitted on the currently scheduled RB, the second base station receives video feature parameter information sent by the first UE, where the video feature parameter information includes a video bitrate, the video buffer duration of the service of the first UE, and the video playback status information of the service of the first UE, where the video bitrate is used to determine the target rate, and the video playback status information of the service of the first UE is the normal playback or frame freezing.

With reference to the second aspect, in one embodiment, before the second base station determines whether the user is satisfied with the service that is of the first UE and that is transmitted on the currently scheduled RB, the second base station receives video service identification information sent by the first UE, where the video service identification information is used to identify whether the service that is of the first UE and that is transmitted on the currently scheduled RB is the video service; and in this case, the determining, by a second base station, whether a service that is of the first UE and that is transmitted on a currently scheduled RB is a video service may specifically include: determining, by the second base station based on the video service identification information, whether the service that is of the first UE and that is transmitted on the currently scheduled RB is the video service.

With reference to the second aspect, in one embodiment, the determining, by a second base station, whether a service that is of the first UE and that is transmitted on a currently scheduled RB is a video service may specifically include: obtaining, by the second base station, identification information of the service of the first UE, where the identification information includes at least one of the following: a domain name or an IP address; and determining, by the second base station based on the identification information of the service of first UE, whether the service that is of the first UE and that is transmitted on the currently scheduled RB is the video service.

A third aspect of the embodiments of the present invention provides a first base station, including a determining unit, a judging unit, and an adjustment unit, where the determining unit is configured to determine that first UE transmitting a service on a currently scheduled RB is benefited UE, where a cell in which the first UE is located is a first cell; the judging unit is configured to determine whether a user is satisfied with a service that is of second UE and that is transmitted on the currently scheduled RB, where a cell in which the second UE is located is a second cell, and the second cell is a cell adjacent to the first cell; and the adjustment unit is configured to adjust a transmit weight of the second UE if the judging unit determines that the user is satisfied with the service that is of the second UE and that is transmitted on the currently scheduled RB.

With reference to the third aspect, in one embodiment, the judging unit is further configured to determine whether the service that is of the second UE and that is transmitted on the currently scheduled RB is a video service; and the judging unit is specifically configured to: if the service that is of the second UE and that is transmitted on the currently scheduled RB is the video service, determine whether the user is satisfied with the service that is of the second UE and that is transmitted on the currently scheduled RB.

With reference to the third aspect, in one embodiment, the adjustment unit is further configured to adjust the transmit weight of the second UE if the judging unit determines that the service that is of the second UE and that is transmitted on the currently scheduled RB is not the video service.

With reference to the third aspect, in one embodiment, the judging unit is specifically configured to determine whether a scheduling rate of the service of the second UE is greater than or equal to a target rate; and/or determine whether video buffer duration of the service of the second UE is greater than or equal to a preset duration threshold; and/or determine whether video playback status information of the service of the second UE is normal playback.

With reference to the third aspect, in one embodiment, the first base station further includes: a receiving unit, configured to receive video feature parameter information sent by the second UE, where the video feature parameter information includes a video bitrate, the video buffer duration of the service of the second UE, and the video playback status information of the service of the second UE, where the video bitrate is used to determine the target rate, and the video playback status information of the service of the second UE is the normal playback or frame freezing.

With reference to the third aspect, in one embodiment, the receiving unit is further configured to receive video service identification information sent by the second UE, where the video service identification information is used to identify whether the service that is of the second UE and that is transmitted on the currently scheduled RB is the video service; and the judging unit is specifically configured to: determine, based on the video service identification information received by the receiving unit, whether the service that is of the second UE and that is transmitted on the currently scheduled RB is the video service.

With reference to the third aspect, in one embodiment, the judging unit is specifically configured to: obtain identification information of the service of the second UE, where the identification information includes at least one of the following: a domain name or an Internet protocol IP address; and determine, based on the identification information of the service of the second UE, whether the service that is of the second UE and that is transmitted on the currently scheduled RB is the video service.

With reference to the third aspect, in one embodiment, the determining unit is specifically configured to determine that the first UE is the benefited UE, when determining that the service that is of the first UE and that is transmitted on the currently scheduled RB is a video service, and determining that a difference between RSRP of the first cell and RSRP of a neighboring cell that are in a measurement report reported by the first UE is less than a preset interference threshold, where the neighboring cell includes the second cell.

With reference to the third aspect, in one embodiment, the determining unit is specifically configured to determine that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

With reference to the third aspect, in one embodiment, the determining unit is specifically configured to: receive indication information sent by a second base station, where the indication information is used to indicate that the first UE is the benefited UE; and determine, according to the indication information, that the first UE transmitting the service on the currently scheduled RB is the benefited UE.

A fourth aspect of the embodiments of the present invention provides a second base station, including: a determining unit and a sending unit, where the determining unit is configured to determine that first UE is benefited UE, when determining that a service that is of the first UE and that is transmitted on a currently scheduled RB is a video service, and determining that a difference between RSRP of a first cell and RSRP of a neighboring cell that are in a measurement report reported by the first UE is less than a preset interference threshold, where a cell in which the first UE is located is the first cell, the neighboring cell includes a second cell, and the second cell is a cell managed by a first base station; and the sending unit is configured to send indication information to the first base station, where the indication information is used to indicate that the first UE is the benefited UE.

With reference to the fourth aspect, in one embodiment, the determining unit is configured to determine that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

A fifth aspect of the embodiments of the present invention provides a base station, including at least one processor, at least one memory, at least one transceiver, and at least one bus, where the at least one processor is connected to a memory and a transceiver by using a bus, the memory is configured to store a computer software instruction, and when the base station runs, the processor executes the computer software instruction stored in the memory, so that the base station performs the beam avoidance method according to any one of the first aspect or the possible embodiments of the first aspect, or any one of the second aspect or the possible embodiments of the second aspect.

A sixth aspect of the embodiments of the present invention provides a computer storage medium, configured to store a computer software instruction used by the foregoing base station, where the computer software instruction includes a program designed to perform the foregoing beam avoidance method.

DESCRIPTION OF EMBODIMENTS

To resolve a problem of an increase in a probability of deterioration in performance of UE on which beam avoidance is performed in a coordinated cell, embodiments of the present invention provide a beam avoidance method. A basic principle of the beam avoidance method is as follows: When a first base station determines that first UE transmitting a service on a currently scheduled RB is benefited UE, the first base station determines whether a user is satisfied with a service that is of second UE and that is transmitted on the currently scheduled RB, and the first base station adjusts a transmit weight of the second UE if the user is satisfied with the service that is of the second UE and that is transmitted on the currently scheduled RB. If the first base station managing a coordinated cell determines that UE in a neighboring cell that transmits a service on the currently scheduled RB is benefited UE, when the first base station determines that a user is satisfied with a service of UE in the coordinated cell that is transmitted on the currently scheduled RB, the first base station adjusts a transmit weight of the UE, to implement beam avoidance for the benefited UE, namely, the UE in the neighboring cell. Beam avoidance is performed on the UE in the coordinated cell that serves as impacted UE only when it is determined that the user is satisfied with the service of the UE. Therefore, a probability of deterioration in performance of the UE on which the beam avoidance is performed in the coordinated cell is reduced.

The following describes implementations of the embodiments of the present invention in detail with reference to accompanying drawings.

Figure 1:
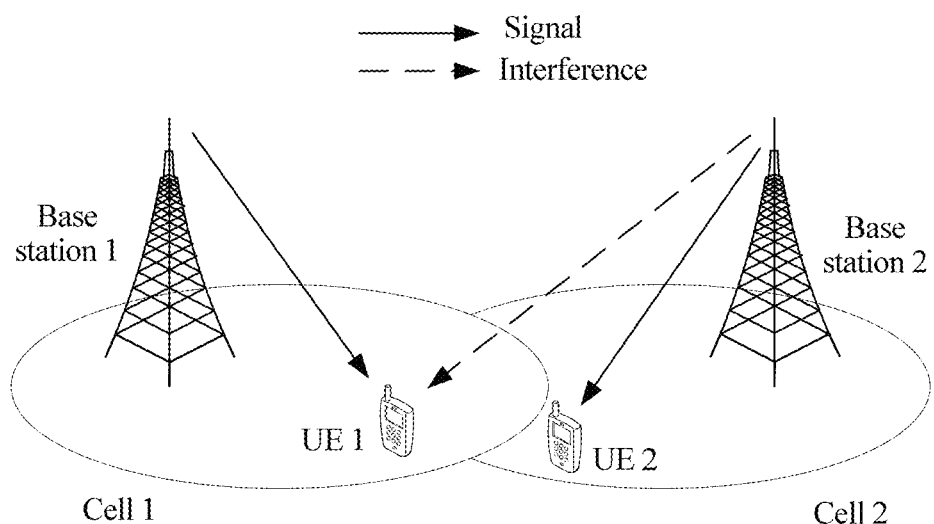
FIG. 1 is a schematic diagram of a scenario to which a CBF technology is applicable according to an embodiment of the present invention.
Figure 2:
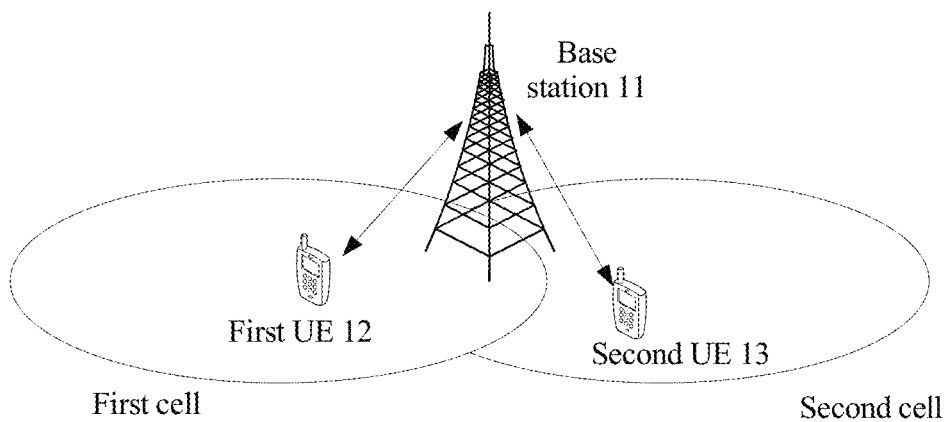
FIG. 2 is a simplified schematic diagram of a system architecture to which an embodiment of the present invention is applied according to an embodiment of the present invention.
Figure 3:
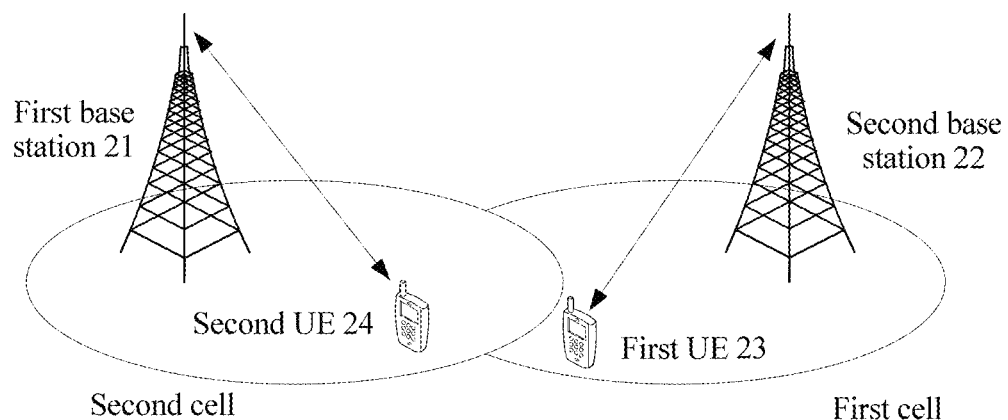
FIG. 3 is a simplified schematic diagram of another system architecture to which an embodiment of the present invention is applied according to an embodiment of the present invention.

FIG. 2 and FIG. 3 each are a simplified schematic diagram of a system architecture to which an embodiment of the present invention is applicable. The system may be a fifth generation mobile communications technology (5G) system and a subsequently evolved communications system, or may be a communications system such as an LTE system, a third generation mobile communications technology (3G) system, a second generation mobile communications technology (2G) system, a wireless fidelity (WiFi) system, or a world interoperability for microwave access (WIMAX) system. In addition, when the system is the LTE system, the system may be specifically a frequency division duplex (FDD) system or a time division duplex (TDD) system.

At least two UEs are involved during beam avoidance. When two UEs are involved, the two UEs are located in two different cells, and the two different cells are adjacent to each other. In addition, for ease of description, in the embodiments of the present invention, the two cells are referred to as a first cell and a second cell. In addition, in one embodiment, the first cell and the second cell may be managed by a same base station, or may be managed by different base stations. For different quantities of base stations managing the first cell and the second cell, system architectures to which the embodiments of the present invention are applicable are separately described herein in the embodiments of the present invention.

In a first application scenario, the first cell and the second cell are managed by a same base station. As shown in FIG. 2, the system architecture may include a base station 11, first UE 12, and second UE 13. A cell in which the first UE 12 is located is the first cell. A cell in which the second UE 13 is located is the second cell. The first cell is adjacent to the second cell. Both the first cell and the second cell are managed by the base station 11.

In a second application scenario, the first cell and the second cell are managed by different base stations. As shown in FIG. 3, the system architecture may include a first base station 21, a second base station 22, first UE 23, and second UE 24. A cell in which the first UE 23 is located is the first cell. A cell in which the second UE 24 is located is the second cell. The first cell is adjacent to the second cell. The first cell is managed by the second base station 22. The second cell is managed by the first base station 21.

The base station 11, the first base station 21, and the second base station 22 may all be base stations (BS), base station controllers, or the like in wireless communications. Specifically, the base stations may include a user plane base station and a control plane base station. The base station is an apparatus deployed in a radio access network and configured to provide a wireless communication function for UE. Main functions of the base station include: managing radio resources, compressing an IP header, encrypting a user data stream, selecting a mobility management entity (MME) when user equipment is attached, routing user plane data to a serving gateway (SGW), organizing and sending a paging message, organizing and sending a broadcast message, performing measurement for a mobility or scheduling purpose, configuring a measurement report, and the like. The base station may include various forms of macro base stations, micro base stations, relay nodes, access points, or the like. Names of devices having a function of the base station may vary in systems using different radio access technologies. For example, in the LTE system, the device is referred to as an evolved NodeB (eNB or eNodeB); in the 3G system, the device is referred to as a NodeB; and in a next generation wireless communications system, the device is referred to as a gNB. The name "base station" may vary with evolution of a communications technology. In addition, in another possible case, the base station may be another apparatus providing the wireless communication function for UE. For ease of description, in the embodiments of the present invention, an apparatus providing the wireless communication function for UE is referred to as a base station. In one embodiment, the base station may specifically include: a packet data convergence protocol (PDCP) layer, a media access control (MAC) layer, and a physical layer. In addition, the PDCP layer of the base station manages a video feature parameter, for example, identifies a video service, and estimates a bitrate. The MAC layer of the base station implements a scheduling control algorithm, selects a benefited UE, makes a decision for beam avoidance, and so on. The physical layer of the base station allocates power, designs a weight, adjusts an MCS, and so on.

The UE (such as the first UE 12 and the second UE 24) in the foregoing system architecture includes various handheld devices (such as a mobile phone, an intelligent terminal, a multimedia device, or a streaming media device) having a wireless communication function, an vehicle-mounted device, a wearable device, a computing device, another processing device connected to a wireless modem, various forms of UEs, a mobile station (MS), a terminal device, and the like. For ease of description, the devices mentioned above are collectively referred to as UE.

Figure 4:
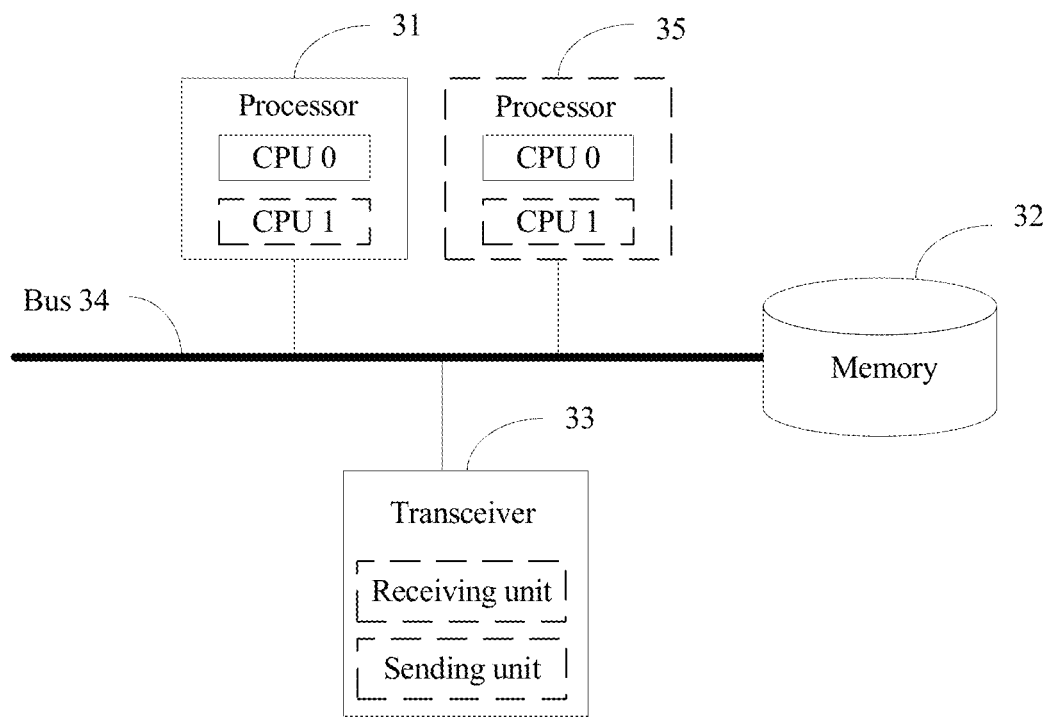
FIG. 4 is a schematic composition diagram of a base station according to an embodiment of the present invention.

FIG. 4 is a schematic composition diagram of a base station according to an embodiment of the present invention. As shown in FIG. 4, the base station may include at least one processor 31, a memory 32, a transceiver 33, and a bus 34.

The components of the base station are described in detail below with reference to FIG. 4.

The processor 31 is a control center of the base station, and may be one processor, or a collective name of a plurality of processing elements. For example, the processor 31 may be a central processing unit (CPU) or an application-specific integrated circuit (ASIC), or may be configured as one or more integrated circuits implementing this embodiment of the present invention, for example, one or more microprocessors (DSP) or one or more field programmable gate arrays (FPGA).

The processor 31 may perform various functions of the base station by running or executing a software program stored in the memory 32, and invoking data stored in the memory 32.

In one embodiment, the processor 31 may include one or more CPUs such as a CPU 0 and a CPU 1 shown in FIG. 4.

In one embodiment, the base station may include a plurality of processors such as a processor 31 and a processor 35 shown in FIG. 4. Each of these processors may be a single-core processor (single-CPU) or a multi-core processor (multi-CPU). The processor herein may be one or more devices, circuits, and/or processing cores for processing data (such as a computer program instruction).

The memory 32 may be a read-only memory (ROM), another type of static storage device that can store static information and a static instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory 32 may exist independently, and is connected to the processor 31 by using the bus 34. Alternatively, the memory 32 may be integrated into the processor 31.

The memory 32 is configured to store a software program for executing the solutions in the present invention, where the execution is controlled by the processor 31.

The transceiver 33 is configured to communicate with another device or a communications network such as the Ethernet, a RAN, or a wireless local area network (WLAN). The transceiver 33 may include a receiving unit that implements a receiving function and a sending unit that implements a sending function.

The bus 34 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

The device structure shown in FIG. 4 does not constitute a limitation on the base station. The base station may include more or fewer components than those shown in the figure, or some components may be combined, or the components may be arranged differently. It should be noted that, the base station shown in FIG. 4 may be the base station 11 in the system architecture shown in FIG. 2, or may be the first base station 21 or the second base station 22 in the system architecture shown in FIG. 3.

Figure 5:
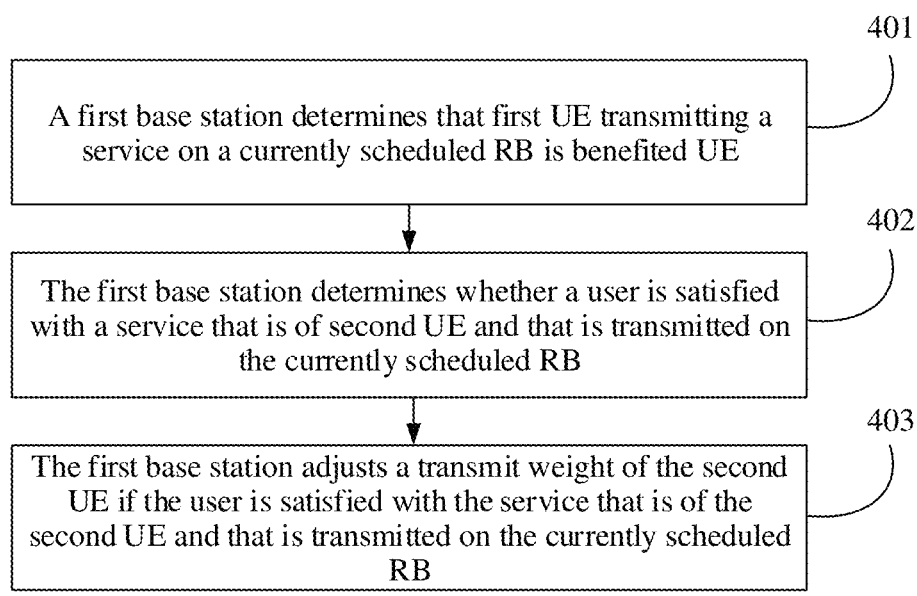
FIG. 5 is a flowchart of a beam avoidance method according to an embodiment of the present invention.

FIG. 5 is a flowchart of a beam avoidance method according to an embodiment of the present invention. As shown in FIG. 5, the method may include the following operations.

401. A first base station determines that first UE transmitting a service on a currently scheduled RB is benefited UE.

A cell in which the first UE is located is a first cell.

402. The first base station determines whether a user is satisfied with a service that is of second UE and that is transmitted on the currently scheduled RB.

A cell in which the second UE is located is a second cell. The second cell is a cell adjacent to the first cell. The second cell may serve as a coordinated cell of the first cell. Interference on the first UE is suppressed through beam avoidance. Both the first cell and the second cell may be managed by the first base station. Alternatively, the second cell may be managed by the first base station, and the first cell may be managed by a second base station.

For example, in a CBF technology, when a base station managing the second cell, namely, the first base station makes a decision for beam avoidance, to avoid an increase in a probability of deterioration in performance of UE on which beam avoidance is performed in the second cell, namely, the second UE, when determining that the first UE transmitting the service on the currently scheduled RB is the benefited UE, the first base station may determine whether the user is satisfied with the service that is of the second UE and that is transmitted on the currently scheduled RB.

403. The first base station adjusts a transmit weight of the second UE if the user is satisfied with the service that is of the second UE and that is transmitted on the currently scheduled RB.

For example, when the first base station determines that the user is satisfied with the service that is of the second UE and that is transmitted on the currently scheduled RB, it indicates that the second UE can serve as impacted UE, that is, can serve as UE for avoidance. In this case, the first base station may adjust the transmit weight of the second UE to implement beam avoidance, thereby suppressing the interference on the first UE, and improving an SINR of the first UE.

According to the beam avoidance method provided in this embodiment of the present invention, when determining that the first UE transmitting the service on the currently scheduled RB is the benefited UE, the first base station determines whether the user is satisfied with the service that is of the second UE and that is transmitted on the currently scheduled RB, and adjusts the transmit weight of the second UE if the user is satisfied with the service that is of the second UE and that is transmitted on the currently scheduled RB. If the first base station managing a coordinated cell determines that UE in a neighboring cell that transmits a service on the currently scheduled RB is benefited UE, when the first base station determines that a user is satisfied with a service of UE in the coordinated cell that is transmitted on the currently scheduled RB, the first base station adjusts a transmit weight of the UE, to implement beam avoidance for the benefited UE, namely, the UE in the neighboring cell. Beam avoidance is performed on the UE in the coordinated cell that serves as impacted UE only when it is determined that the user is satisfied with the service of the UE. Therefore, a probability of deterioration in performance of the UE on which the beam avoidance is performed in the coordinated cell is reduced.

Figure 6:
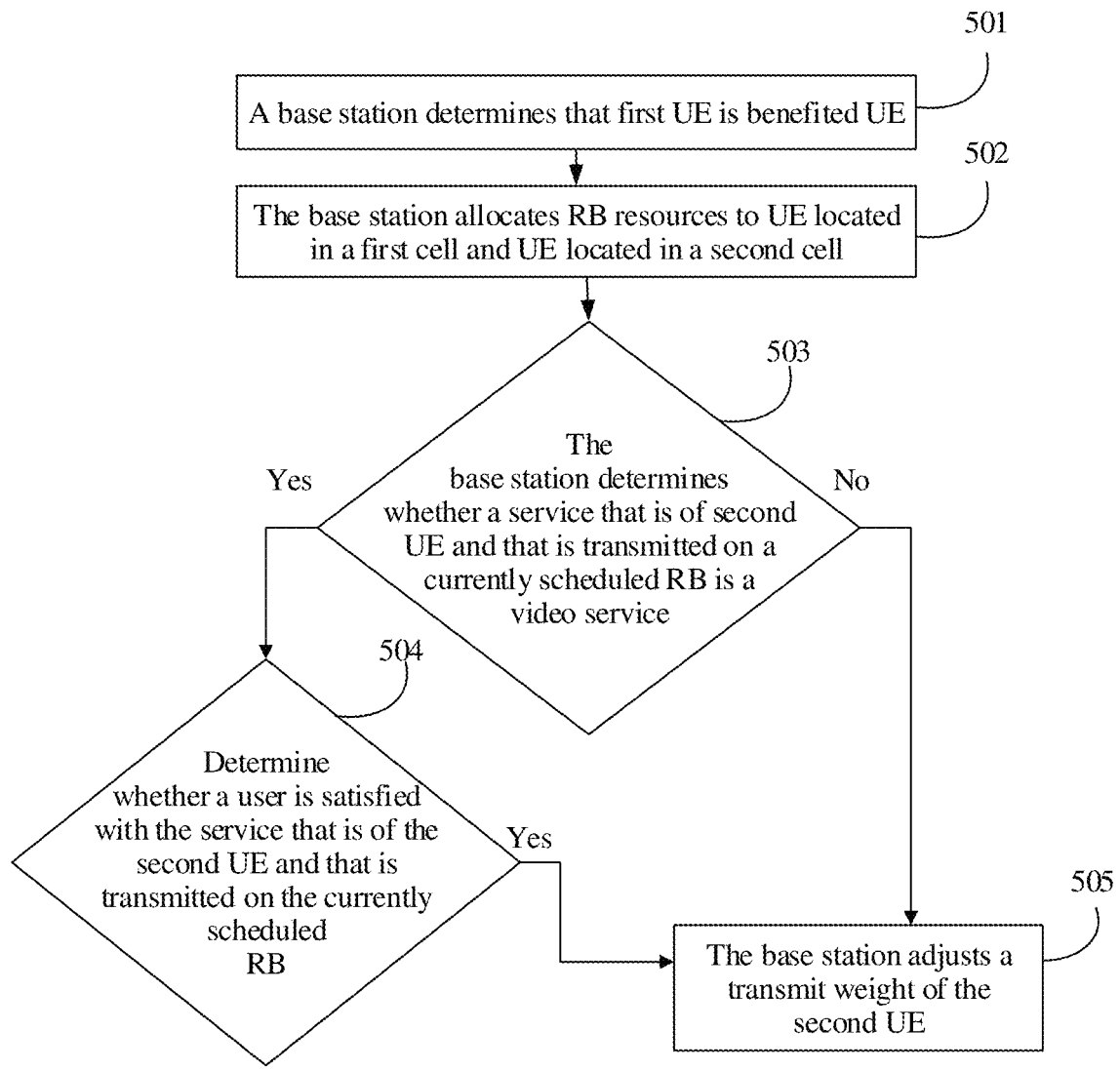
FIG. 6 is a flowchart of another beam avoidance method according to an embodiment of the present invention.

FIG. 6 is a flowchart of another beam avoidance method according to an embodiment of the present invention. It should be noted that, the beam avoidance method provided in this embodiment of the present invention is applicable to a CBF technology. Therefore, for ease of understanding by a person skilled in the art, in this embodiment of the present invention, an algorithm procedure of a CBF technology in a TDD system and the system architecture (in which a first cell and a second cell are managed by a same base station) shown in FIG. 2 are used as examples herein, to describe in detail the beam avoidance method provided in this embodiment of the present invention. Assuming that the second cell is a coordinated cell, and there is no interaction delay between cells, a neighboring cell (namely, the first cell) of the coordinated cell can transmit a scheduling result of benefited UE to the coordinated cell (namely, the second cell) in time, and the base station managing the coordinated cell can determine, in a same TTI, whether beam avoidance needs to be performed for the benefited UE and how to perform beam avoidance for the benefited UE. As shown in FIG. 6, the method may include the following operations.

501. A base station determines that first UE is benefited UE.

It is common knowledge that the CBF technology is applicable to large-sized traffic, and cannot benefit a user with small-sized traffic and may cause a negative gain. In addition, because a video service is large-sized traffic, to ensure that a stable positive gain can be obtained by using the CBF technology, that a base station determines that first UE is benefited UE may be specifically: the base station determines that a service in progress of the first UE is the video service, and determines that a difference between RSRP of a first cell (the first cell is a cell in which the first UE is located) and RSRP of a neighboring cell (the neighboring cell includes a second cell) that are in a measurement report reported by the first UE is less than a preset interference threshold. In other words, the base station determines that the first UE is the benefited UE, when determining that the service in progress of the first UE is the video service, and determining that the difference between the RSRP of the first cell and the RSRP of the neighboring cell that are in the measurement report reported by the first UE is less than the preset interference threshold.

In one embodiment, the base station may determine, in the following two manners, that the service in progress of the first UE is the video service.

Manner 1: The base station negotiates with the first UE, to learn that the service in progress of the first UE is the video service.

The base station receives video service identification information sent by the first UE, where the video service identification information is used to identify that the service in progress of the first UE is the video service. In this case, the base station may determine, based on the received video service identification information, that the service in progress of the first UE is the video service. For example, the video service identification information may be added by the first UE to video feature parameter information and reported in real time to the base station.

Manner 2: The base station itself identifies that the service in progress of the first UE is the video service.

The base station may obtain identification information of the service of the first UE, where the identification information includes at least one of the following: a domain name or an IP address, and determine, based on the identification information of the service of the first UE, that the service in progress of the first UE is the video service.

For example, the base station may configure an A3 measurement event for the first UE, so that the first UE measures RSRP of a cell (namely, the first cell) in which the first UE is currently located and RSRP of a cell adjacent to the cell in which the first UE is currently located, and reports a measurement result to the base station when the measurement result meets a condition. Assuming that the cell in which the first UE is currently located is the first cell, and the cell adjacent to the cell in which the first UE is currently located includes the second cell, the first UE measures the first cell and the second cell to obtain the RSRP of the first cell and RSRP of the second cell, and reports a measurement report to the base station when determining that the measurement result meets a condition, where the measurement report includes the RSRP of the first cell and the RSRP of the second cell. In this way, after receiving the measurement report from the first UE, the base station may determine whether a difference between the RSRP of the first cell (the RSRP of the first cell is indicated by $RSRP_{ServCell}$) and the RSRP of the second cell (the RSRP of the second cell is indicated by $RSRP_{Neighborcell}$) less than the preset interference threshold (the preset is interference threshold is indicated by th, and a default value of the interference threshold is 5 dB). That is, the base station determines whether the RSRP of the first cell and the RSRP of the second cell meet $RSRP_{ServCell}-RSRP_{Neighborcell}<th$. The base station may determine that the first UE is the benefited UE, when determining that the RSRP of the first cell and the RSRP of the second cell meet $RSRP_{ServCell}-RSRP_{Neighborcell}<th$, and determining that the service in progress of the first UE is the video service. In this case, the second cell may also be referred to as a coordinated cell of the first UE.

It should be noted that, in this embodiment of the present invention, only an example in which the measurement report reported by the first UE includes the RSRP of the second cell is used for description. Certainly, the measurement report reported by the first UE may further include RSRP of another cell adjacent to the first cell. Correspondingly, the another cell adjacent to the first cell may also be referred to as a coordinated cell of the first UE. In addition, because neighboring cells causing strongest interference to the first UE mainly include two neighboring cells, a default value of a largest coordinating cluster of the first UE is 3.

502. The base station allocates RB resources to UE located in the first cell and UE located in the second cell.

For example, it is assumed that cells managed by the base station include only the first cell and the second cell. The base station may allocate, according to a predetermined scheduling criterion, an RB resource to each of the UE located in the first cell and the UE located in the second cell. For example, a preset rule is a proportional fair scheduling algorithm by default.

In addition, in this embodiment of the present invention, it is assumed that the base station allocates a same RB resource to the first UE located in the first cell and second UE located in the second cell.

It should be noted that, in this embodiment of the present invention, there is no particular order of performing block 501 and block 502. To be specific, block 501 may be performed first, and then block 502 is performed, or block 502 may be performed first, and then block 501 is performed. Certainly, block 501 and block 502 may alternatively be performed at the same time. The order of performing block 501 and block 502 is not specifically limited in this embodiment of the present invention.

503. The base station determines whether a service that is of the second UE and that is transmitted on a currently scheduled RB is a video service.

For example, for the currently scheduled RB, after the base station performs block 501, that is, determines that the first UE transmitting a service on the currently scheduled RB is the benefited UE, to further ensure that a stable positive gain can be obtained by using the CBF technology, the base station may first determine whether the service that is of the second UE and that is transmitted on the currently scheduled RB is the video service. If the base station determines that the service that is of the second UE and that is transmitted on the currently scheduled RB is the video service, the base station may perform block 504. If the base station determines that the service that is of the second UE and that is transmitted on the currently scheduled RB is not the video service, the base station may directly consider the second UE as UE for beam avoidance, that is, may perform block 505.

In one embodiment, the base station may determine, in the following two manners, whether the service that is of the second UE and that is transmitted on the currently scheduled RB is the video service.

Manner 1: The base station negotiates with the second UE, to learn whether the service that is of the second UE and that is transmitted on the currently scheduled RB is the video service.

The base station receives video service identification information sent by the second UE, where the video service identification information is used to identify whether the service that is of the second UE and that is transmitted on the currently scheduled RB is the video service. In this case, the base station may determine, based on the received video service identification information, whether the service that is of the second UE and that is transmitted on the currently scheduled RB is the video service. For example, the video service identification information may be added by the second UE to video feature parameter information and reported in real time to the base station. For example, it is assumed that one-bit information is used to identify whether the service that is of the second UE and that is transmitted on the currently scheduled RB is the video service, and when the video service identification information is 1, it identifies that the service that is of the second UE and that is transmitted on the currently scheduled RB is the video service, or when the video service identification information is 0, it identifies that the service that is of the second UE and that is transmitted on the currently scheduled RB is not the video service. Correspondingly, the base station may determine, when determining that the received video service identification information is 1, that the service that is of the second UE and that is transmitted on the currently scheduled RB is the video service, or determine, when determining that the received video service identification information is 0, that the service that is of the second UE and that is transmitted on the currently scheduled RB is not the video service.

Manner 2: The base station itself identifies whether the service that is of the second UE and that is transmitted on the currently scheduled RB is the video service.

The base station may obtain identification information of the service of the second UE, where the identification information includes at least one of the following: a domain name or an IP address, and determine, based on the identification information of the service of the second UE, whether the service that is of the second UE and that is transmitted on the currently scheduled RB is the video service. For example, when determining, based on the domain name included in the identification information, that a server providing a service for the second UE is a video server, the base station determines that the service that is of the second UE and that is transmitted on the currently scheduled RB is the video service.

504. The base station determines whether a user is satisfied with the service that is of the second UE and that is transmitted on the currently scheduled RB.

To avoid deterioration in performance of UE in the coordinated cell (namely, the second cell) after beam avoidance is performed on the UE, for example, if a rate of the UE is already less than a target rate or frame freezing already occurs in a video of the UE before beam avoidance, performance of the UE deteriorates if beam avoidance is performed on the UE, and user experience deteriorates, that is, to reduce a probability of deterioration in the performance of the UE on which beam avoidance is performed in the coordinated cell, when determining that the service that is of the second UE and that is transmitted on the currently scheduled RB is the video service, the base station continues to determine whether the user is satisfied with the service that is of the second UE and that is transmitted on the currently scheduled RB. If the base station determines that the user is satisfied with the service that is of the second UE and that is transmitted on the currently scheduled RB, the base station may consider the second UE as the UE for beam avoidance, that is, perform block 505. If the base station determines that the user is not satisfied with the service that is of the second UE and that is transmitted on the currently scheduled RB, the base station may not consider the second UE as a user for beam avoidance. In this case, the base station does not adjust a transmit weight for the second UE to avoid interference.

For example, the base station may determine, by separately using any one of the following three manners, or by using a combination of any two or all of the following three manners, whether the user is satisfied with the service that is of the second UE and that is transmitted on the currently scheduled RB.

Manner 1: The base station determines whether a scheduling rate of the service of the second UE is greater than or equal to a target rate.

The scheduling rate may be obtained by the base station through statistics collection. The target rate may be obtained based on a video bitrate. For example, the target rate is equal to K times the video bitrate, where K is 1.2 by default. The video bitrate may be estimated by the base station based on a size of an incoming packet and a rule such as a rate change trend, or may be added by the second UE to the video feature parameter information in block 503 and reported to the base station.

Manner 2: The base station determines whether video buffer duration of the service of the second UE is greater than or equal to a preset duration threshold.

Manner 3: The base station determines whether video playback status information of the service of the second UE is normal playback.

The video buffer duration of the service of the second UE and the video playback status information of the service of the second UE may also be added by the second UE to the video feature parameter information in block 503 and reported to the base station. The video playback status information of the service of the second UE is the normal playback or frame freezing.

505: The base station adjusts the transmit weight of the second UE.

When determining that the user is satisfied with the service that is of the second UE and that is transmitted on the currently scheduled RB, the base station may use the second UE as the UE for beam avoidance, adjust the transmit weight of the second UE, and update a modulation coding strategy (MCS) of the second UE. Specifically, a signal channel eigenvector of each UE in the second cell may be combined with an interference channel eigenvector from the second cell to benefited UE (including not only the first UE located in the first cell) in a neighboring cell for zero forcing, to determine the transmit weight of the second UE, and then the transmit weight of the second UE is adjusted. For example, specific methods for zero forcing include: eigenvector zero forcing (EZF) and regularized eigenvector zero forcing (REZF).

It may be understood that, although the CBF technology improves an SINR of the benefited UE and a rate of an edge user, the CBF technology may cause deterioration in the UE on which beam avoidance is performed in the coordinated cell. Therefore, to reduce impact on performance of the UE in the coordinated cell, it is considered that beam avoidance is not to be performed for benefited UE with higher user satisfaction or benefited UE with better video user experience before beam avoidance. That is, in this embodiment of the present invention, the benefited UE with higher user satisfaction or the benefited UE with better video user experience before beam avoidance is not considered during the adjustment to the transmit weight of the second UE. For a specific determining method, refer to specific descriptions of corresponding content in block 504 in this embodiment of the present invention. Details are not described herein again in the present invention. In addition, when the benefited UE with higher user satisfaction or the benefited UE with better video user experience before beam avoidance is not considered during the adjustment to the transmit weight of the second UE, determining related to this case may be performed when whether the first UE is the benefited UE is being determined. To be specific, block 501 is specifically: determining that the first UE is the benefited UE, when determining that the service in progress of the first UE is the video service, determining that the difference between the RSRP of the first cell and the RSRP of the neighboring cell is less than the preset interference threshold, and determining that a user is satisfied with the service in progress of the first UE. This is not specifically limited in this embodiment of the present invention.

For ease of understanding by a person skilled in the art, determining, through EZF, a transmit weight of UE on which avoidance is performed is described below by using an example with reference to FIG. 7.

For the UE in the coordinated cell, a method the same as a non-collaborative baseline is used. An eigenvector participating in combination is determined based on a scheduling rank of the UE. If the scheduling rank is 1, the eigenvector participating in combination is a primary eigenvector. If the scheduling rank is 2, eigenvectors participating in combination are primary and secondary eigenvectors.

For the benefited UE in the neighboring cell of the coordinated cell, eigenvalue decomposition is performed on a channel from the benefited UE to the coordinated cell that is measured by using a sounding reference signal (SRS). If a ratio of the primary eigenvalue to the secondary eigenvalue is greater than a particular threshold (an empirical value is 2), the eigenvector participating in combination is the corresponding primary eigenvector. If a ratio of the primary eigenvalue to the secondary eigenvalue is less than the threshold, the eigenvectors participating in combination are the corresponding primary and secondary eigenvectors.

Figure 7:
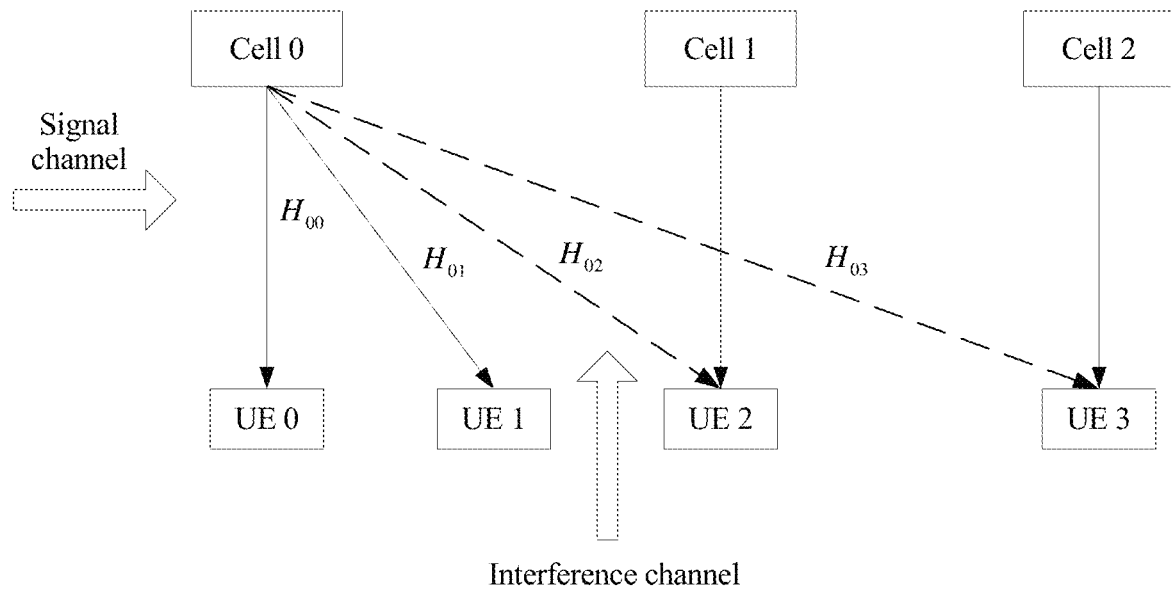
FIG. 7 is a schematic diagram of a scenario in which beam avoidance is performed according to an embodiment of the present invention.

As shown in FIG. 7, a cell 0 is a coordinated cell, a cell 1 and a cell 2 are neighboring cells of the coordinated cell, and both UE 2 and UE 3 are benefited UEs.

It is assumed that for UE in the cell 0, if a scheduling rank of UE 0 is 2, corresponding eigenvectors are $V_{00\_1}$ and $V_{00\_2}$; and if a scheduling rank of UE 1 is 1, a corresponding eigenvector is $V_{01}$. For UE in the cell 1, eigenvectors extracted by the UE 2 based on an interference channel $H_{02}$ are $V_{02\_1}$ and $V_{02\_2}$ For UE in the cell 3, an eigenvector extracted by the UE 3 based on an interference channel $H_{03}$ is $V_{03}$. Therefore, a combined feature matrix is a formula (1):

$$V=[V_{00\_1} V_{00\_2} V_{01} V_{02\_1} V_{02\_2} V_{03}] \qquad (1).$$

A calculation formula for EZF is a formula (2):

$$W=V(V^H V)^{-1} \qquad (2).$$

In this way, a transmit weight of UE on which avoidance is performed can be obtained based on the formula (1) and the formula (2): A transmit weight $W_0$ of the UE 0 is $W_0$=W (:,1:2), that is, the first two columns in W are extracted as the transmit weight of the UE 0; and a transmit weight $W_1$ of the UE 1 is $W_1$=W(:,3).

Further, if weights of the UEs in the coordinated cell need to be changed for beam avoidance, MCSs of these UEs need to be corrected. In one embodiment, the MCS may be corrected by using a method similar to that in a multi-user multiple-input multiple-output (MU-MIMO) technology.

For example, a correlation between an $m^{th}$ stream of UE k and an $l^{th}$ stream of UE j is $\rho_{jlkm}=\langle U_{j,l}, U_{k,m}\rangle=U_{j,l}U^H_{k,m}$, where $U_{j,l}$ is an $l^{th}$ eigenvector (including one row and a plurality of columns) of the UE j, $U_{km}$ is an $m^{th}$ eigenvector of the UE k, and a residual correlation of the UE k on the $m^{th}$ stream is $$Rem\rho(k, m) = 1 - \sum_{j,l} |\rho_{jlkm}|^2.$$

The residual correlation Remρ(k,m) is used as an SINR correction factor of the $m^{th}$ stream of the UE k. An SINR obtained after pairing of the $m^{th}$ stream of the UE k is $$SINR'_{m,k} = \frac{Rem\rho(k, m)}{M} \times SINR_k \times \Delta SINR_{m,k}.$$

After pairing of each stream, an MCS corresponding to each stream is obtained by searching a table based on the SINR. An MCS of each codeword is obtained by combining MCSs of corresponding streams. Then the MCS of each codeword is added to an open loop link adaptation (OLLA) adjustment amount to obtain an MCS value of each UE after pairing.

It should be noted that, in this embodiment of the present invention, an example in which the benefited UE is only the first UE is used to describe in detail the beam avoidance method provided in this embodiment of the present invention. Certainly, benefited UEs in the first cell may include a plurality of UEs. In addition, when beam avoidance is being performed, the base station may execute a CBF algorithm for all of the plurality of UEs by using the CBF technology. A specific implementation process thereof is similar to that in this embodiment of the present invention. Details are not described herein again in this embodiment of the present invention.

In addition, when the beam avoidance method provided in this embodiment of the present invention is implemented by using the system architecture shown in FIG. 3, a specific implementation process thereof is similar to that of implementing the beam avoidance method provided in this embodiment of the present invention by using the system architecture shown in FIG. 2 (that is, the beam avoidance method shown in FIG. 6). A difference lies in that, block 501 is performed by the base station (for example, the second base station 22 in FIG. 3) managing the first cell; in block 502, the base station (for example, the second base station 22 in FIG. 3) managing the first cell allocates an RB resource to the UE located in the first cell, and the base station (for example, the first base station 21 in FIG. 3) managing the second cell allocates an RB resource to the UE located in the second cell; and block 503 to block 505 are all performed by the base station (for example, the first base station 21 in FIG. 3) managing the second cell.

According to the beam avoidance method provided in this embodiment of the present invention, when determining that the first UE transmitting the service on the currently scheduled RB is the benefited UE, the first base station determines whether the user is satisfied with the service that is of the second UE and that is transmitted on the currently scheduled RB, and adjusts the transmit weight of the second UE if the user is satisfied with the service that is of the second UE and that is transmitted on the currently scheduled RB. If the first base station managing a coordinated cell determines that UE in a neighboring cell that transmits a service on the currently scheduled RB is benefited UE, when the first base station determines that a user is satisfied with a service of UE in the coordinated cell that is transmitted on the currently scheduled RB, the first base station adjusts a transmit weight of the UE, to implement beam avoidance for the benefited UE, namely, the UE in the neighboring cell. Beam avoidance is performed on the UE in the coordinated cell that serves as impacted UE only when it is determined that the user is satisfied with the service of the UE. Therefore, a probability of deterioration in performance of the UE on which the beam avoidance is performed in the coordinated cell is reduced.

In addition, the base station determines that UE that is severely interfered with and that is performing a video service in a cell is benefited UE. Because the video service is large-sized traffic, this ensures that a stable positive gain can be obtained by using the CBF technology, and avoids a negative gain that is caused by avoidance performed for UE having small-sized traffic. In addition, when beam avoidance is being performed, only benefited UE with poor user experience is considered as an avoidance object, whereas the benefited UE with higher user satisfaction or the benefited UE with better video user experience before beam avoidance is not considered. In this way, a quantity of benefited UEs is reduced, thereby reducing impact on the performance of the UE in the coordinated cell.

The solutions provided in the embodiments of the present invention are mainly described above from a perspective of interaction between network elements. It may be understood that, to implement the foregoing functions, the network elements such as the base station include corresponding hardware structures and/or software modules for performing the functions. A person skilled in the art should be easily aware that, in combination with the examples described in the embodiments disclosed in this specification, algorithm operations can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, functional modules of the base station may be obtained through division according to the foregoing method examples. For example, the functional modules may be obtained through division corresponding to various functions, or two or more functions may be integrated into one processing module. The integrated module may be implemented in a form of hardware, or may be implemented in a form of a software functional module. It should be noted that, in the embodiments of the present invention, module division is an example, and is merely logical function division. In an alternative embodiment, another division manner may be used.

Figure 8:
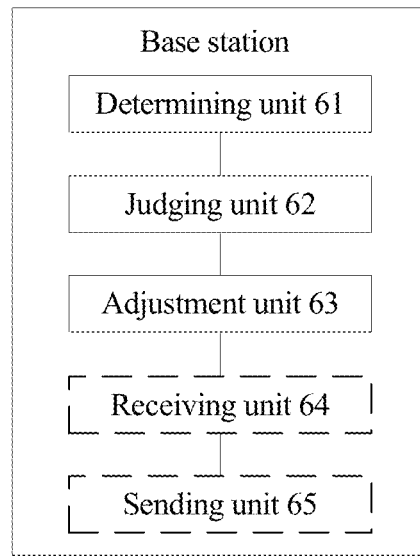
FIG. 8 is a schematic composition diagram of another base station according to an embodiment of the present invention.

FIG. 8 is a possible schematic composition diagram of a base station in the foregoing embodiment when the functional modules are obtained through division corresponding to various functions. As shown in FIG. 8, the base station may include a determining unit 61, a judging unit 62, and an adjustment unit 63.

The determining unit 61 is configured to support the base station in performing block 401 in the beam avoidance method shown in FIG. 5, and block 501 in the beam avoidance method shown in FIG. 6.

The judging unit 62 is configured to support the base station in performing block 402 in the beam avoidance method shown in FIG. 5, and block 503 and block 504 in the beam avoidance method shown in FIG. 6.

The adjustment unit 63 is configured to support the base station in performing block 403 in the beam avoidance method shown in FIG. 5, and block 505 in the beam avoidance method shown in FIG. 6.

As shown in FIG. 8, in this embodiment of the present invention, the base station may further include a receiving unit 64 and a sending unit 65.

The receiving unit 64 is configured to support the base station in performing an operation of receiving the video feature parameter information sent by the second UE, an operation of receiving the video service identification information sent by the second UE, and an operation of receiving the indication information sent by the second base station in the beam avoidance method shown in FIG. 6.

The sending unit 65 is configured to support the base station in performing an operation of sending the indication information to the first base station in the beam avoidance method shown in FIG. 6.

It should be noted that, all related content of the blocks or operations in the foregoing method embodiments can be cited in function descriptions of corresponding functional modules, and details are not described herein again.

The base station provided in this embodiment of the present invention is configured to perform the foregoing beam avoidance method, and therefore, can achieve a same effect as the foregoing beam avoidance method.

Figure 9:
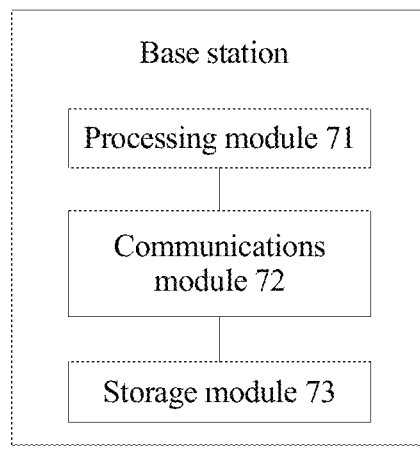
FIG. 9 is a schematic composition diagram of another base station according to an embodiment of the present invention.

FIG. 9 is another possible schematic composition diagram of a base station in the foregoing embodiment when an integrated unit is used. As shown in FIG. 9, the base station includes a processing module 71 and a communications module 72.

The processing module 71 is configured to control and manage an action of the base station. For example, the processing module 71 is configured to support the base station in performing block 401, block 402, and block 403 in FIG. 5, block 501, block 502, block 503, block 504, and block 505 in FIG. 6, and/or another process used for the technology described in this specification. The communications module 72 is configured to support the base station in communicating with another network entity, for example, communicating with a functional module or a network entity shown in FIG. 2 or FIG. 3. The base station may further include a storage module 73, configured to store program code and data of a server.

The processing module 71 may be a processor or a controller. The processor or the controller may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor, and or the like. The communications module 72 may be a transceiver, a transceiver circuit, a communications interface, or the like. The storage module 73 may be a memory.

When the processing module 71 is a processor, the communications module 72 is a transceiver, and the storage module 73 is a memory, the server in this embodiment of the present invention may be the base station shown in FIG. 4.

The foregoing descriptions about implementations allow a person skilled in the art to understand that, for the purpose of convenient and brief description, division of the foregoing functional modules is used as an example for illustration. In one embodiment, the foregoing functions can be assigned to different functional modules for implementation according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an alternative embodiment. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the blocks or operations of the methods described in the embodiments of the present invention. The foregoing storage medium includes any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A beam avoidance method, comprising:
   determining, by a first base station, that first user equipment (UE) transmitting a service on a currently scheduled resource block (RB) is benefited UE, wherein a cell in which the first UE is located is a first cell;
   determining, by the first base station, whether a user is satisfied with a service that is of a second UE and that is transmitted on the currently scheduled RB, wherein a cell in which the second UE is located is a second cell, and the second cell is a cell adjacent to the first cell; and
   adjusting, by the first base station, a transmit weight of the second UE if the user is satisfied with the service that is of the second UE and that is transmitted on the currently scheduled RB.

2. The method according to claim 1, wherein before the determining, by the first base station, whether the user is satisfied with the service that is of the second UE and that is transmitted on the currently scheduled RB, the method further comprises:
   determining, by the first base station, whether the service that is of the second UE and that is transmitted on the currently scheduled RB is a video service; and
   the determining, by the first base station, whether the user is satisfied with the service that is of the second UE and that is transmitted on the currently scheduled RB comprises:
   if the service that is of the second UE and that is transmitted on the currently scheduled RB is the video service, determining, by the first base station, whether the user is satisfied with the service that is of the second UE and that is transmitted on the currently scheduled RB.

3. The method according to claim 2, wherein the determining, by the first base station, whether the user is satisfied with the service that is of the second UE and that is transmitted on the currently scheduled RB comprises:
   determining, by the first base station, whether a scheduling rate of the service of the second UE is greater than or equal to a target rate; and/or
   determining, by the first base station, whether video buffer duration of the service of the second UE is greater than or equal to a preset duration threshold; and/or
   determining, by the first base station, whether video playback status information of the service of the second UE is normal playback.

4. The method according to claim 3, wherein before the determining, by the first base station, whether the user is satisfied with the service that is of the second UE and that is transmitted on the currently scheduled RB, the method further comprises:
   receiving, by the first base station, video feature parameter information sent by the second UE, wherein the video feature parameter information comprises a video bitrate, the video buffer duration of the service of the second UE, and the video playback status information of the service of the second UE, wherein
   the video bitrate is used to determine the target rate, and
   the video playback status information of the service of the second UE is the normal playback or frame freezing.

5. The method according to claim 2, wherein the determining, by the first base station, whether the service that is of the second UE and that is transmitted on the currently scheduled RB is a video service comprises:
   obtaining, by the first base station, identification information of the service of the second UE, wherein the identification information comprises at least one of the following: a domain name or an Internet protocol (IP) address; and
   determining, by the first base station based on the identification information of the service of the second UE, whether the service that is of the second UE and that is transmitted on the currently scheduled RB is the video service.

6. The method according to claim 1, wherein the determining, by a first base station, that first user equipment UE transmitting the service on a currently scheduled resource block (RB) is benefited UE comprises:
   determining, by the first base station, that the first UE is the benefited UE, when determining that the service that is of the first UE and that is transmitted on the currently scheduled RB is a video service, and determining that a difference between reference signal received power (RSRP) of the first cell and RSRP of a neighboring cell that are in a measurement report reported by the first UE is less than a preset interference threshold, wherein the neighboring cell comprises the second cell.

7. The method according to claim 6, wherein the determining, by the first base station, that the first UE is the benefited UE, when determining that the service that is of the first UE and that is transmitted on the currently scheduled RB is the video service, and determining that the difference between reference signal received power (RSRP) of the first cell and RSRP of the neighboring cell that are in the measurement report reported by the first UE is less than the preset interference threshold comprises:
   determining, by the first base station, that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

8. The method according to claim 1, wherein the determining, by a first base station, that first user equipment UE transmitting the service on a currently scheduled resource block RB is benefited UE comprises:

receiving, by the first base station, indication information sent by a second base station, wherein the indication information is used to indicate that the first UE is the benefited UE; and determining, by the first base station according to the indication information, that the first UE transmitting the service on the currently scheduled RB is the benefited UE.

9. A first base station, comprising:
a memory storing instructions; and
a processor coupled to the memory to execute the instructions to:

determine that first user equipment (UE) transmitting a service on a currently scheduled resource block (RB) is benefited UE, wherein a cell in which the first UE is located is a first cell;

determine whether a user is satisfied with a service that is of a second UE and that is transmitted on the currently scheduled RB, wherein a cell in which the second UE is located is a second cell, and the second cell is a cell adjacent to the first cell; and adjust a transmit weight of the second UE if the user is satisfied with the service that is of the second UE and that is transmitted on the currently scheduled RB.

10. The first base station according to claim 9, wherein the processor executes the instructions to:

determine whether the service that is of the second UE and that is transmitted on the currently scheduled RB is a video service; and if the service that is of the second UE and that is transmitted on the currently scheduled RB is the video service, determine whether the user is satisfied with the service that is of the second UE and that is transmitted on the currently scheduled RB.

11. The first base station according to claim 10, wherein the processor executes the instructions to:

determine whether a scheduling rate of the service of the second UE is greater than or equal to a target rate; and/or determine whether video buffer duration of the service of the second UE is greater than or equal to a preset duration threshold; and/or determine whether video playback status information of the service of the second UE is normal playback.

12. The first base station according to claim 11, wherein the processor further executes the instructions to:

receive video feature parameter information sent by the second UE, wherein the video feature parameter information comprises a video bitrate, the video buffer duration of the service of the second UE, and the video playback status information of the service of the second UE, wherein the video bitrate is used to determine the target rate, and the video playback status information of the service of the second UE is the normal playback or frame freezing.

13. The first base station according to claim 10, wherein the processor executes the instructions to:

obtain identification information of the service of the second UE, wherein the identification information comprises at least one of the following: a domain name or an Internet protocol IP address; and determine, based on the identification information of the service of the second UE, whether the service that is of the second UE and that is transmitted on the currently scheduled RB is the video service.

14. The first base station according to claim 9, wherein the processor executes the instructions to:

determine that the first UE is the benefited UE, when determining that the service that is of the first UE and that is transmitted on the currently scheduled RB is a video service, and determining that a difference between reference signal received power RSRP of the first cell and RSRP of a neighboring cell that are in a measurement report reported by the first UE is less than a preset interference threshold, wherein the neighboring cell comprises the second cell.

15. The first base station according to claim 14 wherein the processor executes the instructions to:

determine that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

16. The first base station according to claim 9, wherein the processor executes the instructions to:

receive indication information sent by a second base station, wherein the indication information is used to indicate that the first UE is the benefited UE; and determine, according to the indication information, that the first UE transmitting the service on the currently scheduled RB is the benefited UE.

17. A second base station, comprising:
a memory storing instructions; and
a processor coupled to the memory to execute the instructions to:

determine that first user equipment (UE) is benefited UE, when determining that a service that is of the first UE and that is transmitted on a currently scheduled resource block (RB) is a video service, and determining that a difference between reference signal received power (RSRP) of a first cell and RSRP of a neighboring cell that are in a measurement report reported by the first UE is less than a preset interference threshold, wherein a cell in which the first UE is located is the first cell, the neighboring cell comprises a second cell, and the second cell is a cell managed by a first base station; and send indication information to the first base station, wherein the indication information is used to indicate that the first UE is the benefited UE.

18. The second base station according to claim 17, wherein the processor executes the instructions to:

determine that the first UE is the benefited UE, when determining that the service that is of the first UE and that is transmitted on the currently scheduled RB is the video service, determining that the difference between the RSRP of the first cell and the RSRP of the neighboring cell is less than the preset interference threshold, and determining that a user is satisfied with the service that is of the first UE and that is transmitted on the currently scheduled RB.

* * * * *